(12) United States Patent
Martín Menayo et al.

(10) Patent No.: US 8,315,837 B2
(45) Date of Patent: Nov. 20, 2012

(54) COMPUTER-AIDED METHOD OF OBTAINING A PLY MODEL OF A COMPOSITE COMPONENT

(75) Inventors: Guillermo Martín Menayo, Madrid (ES); Antonio Bolinches Quero, Alicante (ES)

(73) Assignee: Airbus Operations S.L., Madrid (ES)

( * ) Notice: Subject to any disclaimer, the term of this patent is extended or adjusted under 35 U.S.C. 154(b) by 1109 days.

(21) Appl. No.: 11/731,794

(22) Filed: Mar. 30, 2007

(65) Prior Publication Data

US 2007/0244590 A1 Oct. 18, 2007

(30) Foreign Application Priority Data

Mar. 31, 2006 (EP) .................................... 06381014

(51) Int. Cl.
*G06F 17/50* (2006.01)

(52) U.S. Cl. .................... 703/1; 703/2; 703/6; 428/218; 428/336; 428/198; 428/210; 428/152

(58) Field of Classification Search ................. 703/6, 2; 700/98; 428/216, 336, 196, 210
See application file for complete search history.

(56) References Cited

U.S. PATENT DOCUMENTS

| | | | | |
|---|---|---|---|---|
| 5,038,291 | A * | 8/1991 | Wang et al. ..................... | 700/98 |
| 5,984,511 | A * | 11/1999 | Vasey-Glandon et al. ........ | 703/6 |
| 6,341,261 | B1 * | 1/2002 | Vasey-Glandon et al. ........ | 703/6 |
| 7,010,472 | B1 * | 3/2006 | Vasey-Glandon et al. ........ | 703/6 |
| 7,099,725 | B2 * | 8/2006 | Murrish et al. .................. | 700/98 |
| 7,243,055 | B2 * | 7/2007 | Chen et al. ........................ | 703/2 |

OTHER PUBLICATIONS

Rodney Thomson, Murray Scott Experience with the finite element modeling of a full-scale test of a composite aircraft control surface Composite Structures 50, 2000, 331-345.*

* cited by examiner

*Primary Examiner* — Kamini S Shah
*Assistant Examiner* — Cuong Luu
(74) *Attorney, Agent, or Firm* — Ladas & Parry LLP

(57) ABSTRACT

A computer-aided method of obtaining a preliminary ply model of a composite component to be used in the manufacture of industrial parts by stacking and joining a plurality of plies of composite materials, comprising the following steps: a) obtaining from stress calculations a ply stacking sequence for the component subdivided into panels; b) automatically generating a stacking table containing the ply sequence for each different zone (defined by its ply sequence); c) automatically generating a grid table; d) optimizing said stacking table; e) performing the plies drop-off distribution by means of a tool that allows carrying out said distribution automatically according to a predetermined staggering rule; f) obtaining an output table containing the data required for representing the ply model in a CAD program.

3 Claims, 2 Drawing Sheets

COMPUTER-AIDED METHOD OF OBTAINING A PLY MODEL OF A COMPOSITE COMPONENT

FIELD OF THE INVENTION

The present invention refers to a method of obtaining a ply model of a composite component, and more particularly to a computer-aided method of obtaining a preliminary ply model of a composite component able to be used by a CAD program.

BACKGROUND OF THE INVENTION

In some engineering fields there is a large tendency to increase the amount of components made from composite materials, for instance in the aeronautical field: wing skins, covers, fuselage sections are components that may be manufactured using composites materials.

These components are generally made from carbon fiber and consist of different layers (plies) of composite material laid in different orientations in order to obtain a laminate (stacking).

These components are divided into different zones and each zone has its own thickness and therefore its own laminate. The difference in thickness between different zones generates ply drop-offs which need to be organized and represented on a ply model (staggering). This ply model will be used on manufacturing in order to lay-up and manufacture the composite component.

Stress engineers use stress programs to calculate the component behavior under the given loads and design engineers use CAD programs to create ply models.

So far the process of generating such ply CAD models has been a tedious and elaborate procedure involving a large amount of repetitive manual work with the subsequent risk of mistake. Engineers had to organize plies staggering and stacking manually with little or no visual help.

The present invention is intended to solve this drawback.

SUMMARY OF THE INVENTION

This invention provides a computer-aided method of obtaining a preliminary ply model of a composite component to be used in the manufacture of industrial parts by stacking and joining a plurality of plies of composite materials such as carbon fibers, comprising the following steps:

a) Obtaining from stress calculations a ply stacking sequence for the composite component subdivided into a plurality of panels. Said stress calculations are usually made by means of stress programs used to calculate the behavior of composite material components subdivided into areas usually called panels.

b) Automatically generating a stacking table containing the ply sequence for each different zone of the composite component, each zone being defined by its ply sequence. Once the stacking data is obtained from a stress program, said information is organized in this step in a way that a stacking table, representing the laminate for each different zone of the component is obtained automatically. Said table shows the number of stacking zones with their corresponding stacking sequence where each single layer of composite material corresponds to a ply number. To do so this method processes all the stacking sequences from all of the existing panels and groups them in a way that every panel containing the same stacking sequence is assigned the same stacking zone number.

c) Automatically generating a grid table containing identification data of the zone corresponding to each panel.

d) Optimizing said stacking table by means of a graphic tool that allows the automatic detection of possible ply mergers for obtaining larger layers and/or possible ply separations for obtaining single layers forming a closed contour. The purpose of this step is to identify the number of plies to be used in order to obtain the least number of plies possible that follow the stress stacking sequence requirements for each zone, performing any changes that may be needed in order to meet design stacking rules or enhance manufacturing feasibility. The step is performed using a graphical representation wherein stress panels are covered by every single ply. All changes are reflected in the stacking table and the grid table.

e) Performing the plies drop-off distribution (operation usually called staggering) by means of a tool that allows carrying out said distribution automatically according to a predetermined staggering rule and the graphical visualization of said distribution. The purpose of this step is to identify all the plies that end up on a given panel and to order them automatically following design rules.

f) Obtaining an output table containing the data required for representing the ply model in a CAD program and/or representing a sectional view of any of those areas were there is change in stacking sequence.

One aim of this method is to save the interoperativity gap existent from when the stress results are given to design until design produces a ply model.

Another aim of this method is to provide a simple and efficient way of working that can be used to perform an interactive ply engineering process and can be used to automatically obtain plies wireframe geometry data in order to obtain a preliminary ply model to be displayed on any CAD program. Therefore a considerable amount of time and effort can be saved when creating ply models, in particular in the staggering process which has so far been a very tedious and time consuming task.

In this respect, one important feature of this method is to process the stacking requirements given by stress in order to obtain a first ply drop-off arrangement. This initial distribution of plies can then be applied to a CAD program to obtain a preliminary ply model.

Another important feature is that it provides visualization interfaces for checking laminates stacking.

Other characteristics and advantages of the present invention will be clear from the following detailed description of embodiments illustrative of its object in relation to the attached figures.

DETAILED DESCRIPTION OF THE INVENTION

We will now describe an embodiment of this invention for obtaining a preliminary CAD ply model for a HTP skin of an aircraft using Visual Basic as programming language and showing the results in Excel worksheets.

In step a) the stacking sequence is obtained from ARPA, a stress program used to calculate skins behavior under certain load conditions. The output file obtained from ARPA is a file containing, among other data, the stacking sequence for each panel, defined in this case by stringers and ribs as illustrated in the following Table 1.

TABLE 1

| Panel No. | Stringer Id. | Rib Id. | Stacking Sequence (Orientation & Material) |
|---|---|---|---|
| 1 | STR1 | R01 | (45/−45/90/0/90/−45/45) |
| 2 | STR2 | R01 | (45/−45/90/0/90/−45/45/90) |
| 3 | STR3 | R01 | (45/−45/90/0/90/−45/45/90/45) |
| ... | ... | ... | ... |

In step b) the ARPA file is processed to obtain a stacking table containing, among other data, the data schematically shown in the following table

| Ply No. | Orient. | Zone 1 | Zone 2 | Zone 3 | Zone 4 | Zone 5 | Zone 6 | Zone 7 |
|---|---|---|---|---|---|---|---|---|
| 1 | 45 | 45 | 45 | | | | | |
| 2 | 90 | 90 | 90 | 90 | 90 | 90 | | |
| 3 | −45 | | | 45 | 45 | | 45 | |
| ... | ... | ... | ... | ... | ... | ... | ... | ... |
| 60 | 0 | | | | | | | |
| 61 | 45 | | | | 45 | 45 | 45 | 45 |

In step c) the ARPA file is processed to obtain a grid table containing the zone number for each panel, defined by stringers and ribs as schematically shown in the following table.

TABLE 3

| | R01 | R02 | R03 | R04 | R05 | R06 | R07 |
|---|---|---|---|---|---|---|---|
| STR1 | 1 | 1 | 2 | 2 | 3 | 4 | 5 |
| STR2 | 1 | 2 | 3 | 3 | 4 | 4 | 6 |
| STR1 | 2 | 2 | 3 | 3 | 4 | 5 | 7 |

In step d) the stacking table and the grid table are used for representing graphically the panels covered by each ply as schematically shown in the following table.

| | R01 | R02 | R03 | R04 | R05 | R06 | R07 |
|---|---|---|---|---|---|---|---|
| STR1 | | | | | | | |
| STR2 | | | | | | | |
| STR1 | | | | | | | |

Figure 1:
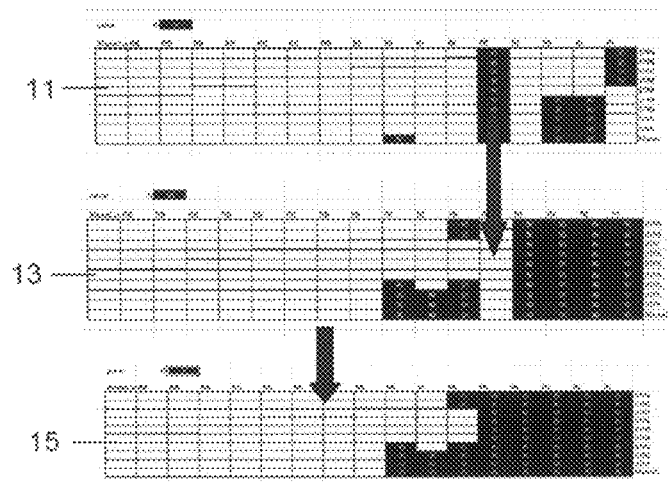
FIG. 1 shows three EXCEL worksheets with graphical representations of the panels covered by a ply illustrating a merger of two plies.

In order to optimize the stacking table the method includes tools for finding whether two different plies can be merged together to obtain a larger layer, reducing manufacturing costs as illustrated in FIG. 1 in which plies X and Y, shown in graphical representations 11, 13 (similar to Table 4 above) are suggested to be merged in ply Z shown in graphical representation 15. The designer is able to decide whether to merge plies or not.

Figure 2:
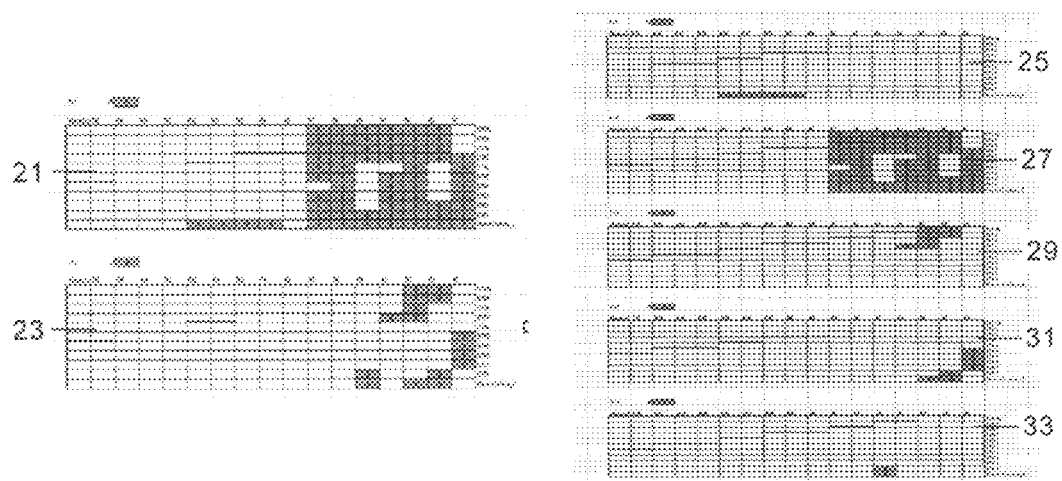
FIG. 2 shows on the left two initial EXCEL worksheets with graphical representations of the panels covered by a ply and on the right five EXCEL worksheets with graphical representations of the panels covered by a ply illustrating a separation of plies.

The method also includes tools for identifying every single composite layer that forms a closed contour and assign them a unique ply number as shown in FIG. 2 where plies X and Y shown in graphical representations 21, 23 are separated into plies Z1, Z2, Z3, Z4 shown in graphical representations 25, 27, 29, 31, 33. This involves a large change in the original stacking table obtained from stress data, as plies and zones may need modifications.

The user can modify manually in any case the stacking table and the grid table so that the ply-model designing process can be performed with a desirable degree of interactivity.

Figure 3A:
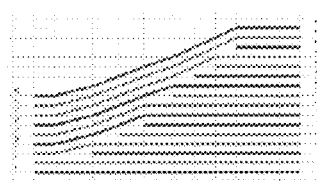
FIGS. 3a, 3b and 3c show EXCEL worksheets illustrating the pyramidal, maximum symmetry and plies at +45/−45 staggered first modes to organize plies drop-off.
Figure 3B:
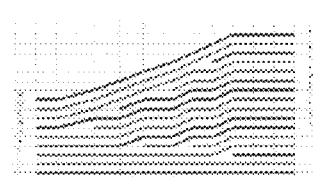
Figure 3C:
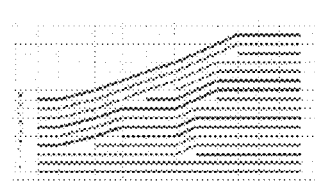

In step e) the staggering process is carried out automatically organizing the plies drop-off according to a predetermined rule such as a pyramidal mode, a maximum symmetry mode or a plies at +45/−45 staggered first mode, schematically shown in FIGS. 3a, 3b and 3c. Others staggering modes could indeed be implemented.

Figure 4:
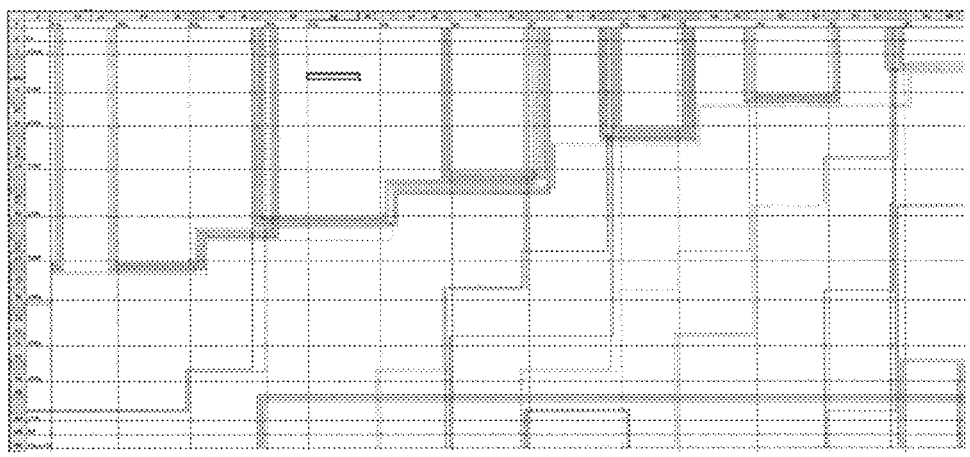
FIG. 4 shows an EXCEL worksheet illustrating plies drop-off for the whole component.
Figure 5:
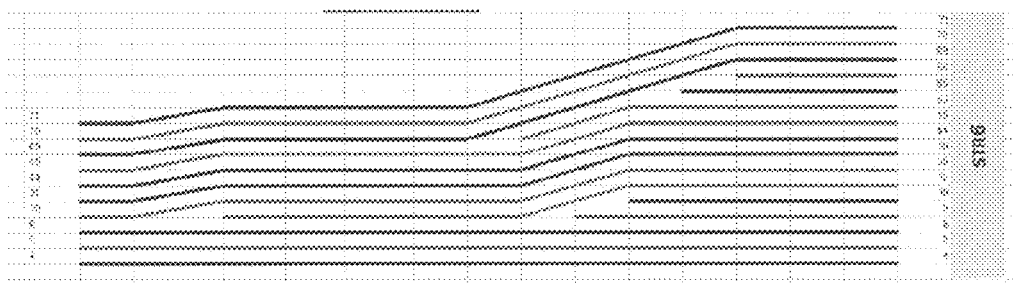
FIG. 5 shows an EXCEL worksheet illustrating a particular ramp of the component.

In step f) the method allows visualizing such drop-offs for the whole component as shown in FIG. 4 or visualizing a particular ramp in a sectional view as shown in FIG. 5.

Figure 6:
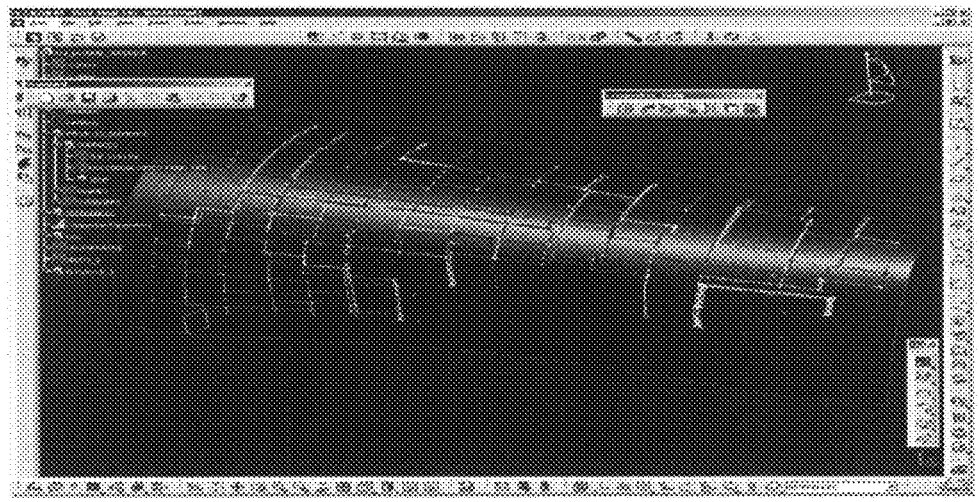
FIG. 6 shows a CATIA representation of the ply model.

Finally, the method provides an output table containing the data required for a CAD program such as CATIA to represent the preliminary ply model as shown in FIG. 6.

Modifications may be introduced into the preferred embodiment just set forth, which are comprised within the scope defined by the following claims.

The invention claimed is:

1. A computer-aided method of obtaining a preliminary ply model of a composite component to be used in the manufacture of industrial parts by stacking and joining a plurality of plies of composite materials comprising the following steps:
   a) obtaining from stress calculations a ply stacking sequence for the composite component subdivided into panels;
   b) based on said ply stacking sequence, automatically generating a first preliminary ply model identifying the panels covered by each ply by means of bidimensional tables;
   c) optimizing said first preliminary ply model merging plies for obtaining larger plies and/or separating plies for obtaining plies forming a closed contour by means of a graphic tool that allows automatic:
      c1) detection of possible ply mergers between plies covering contiguous zones; and
      c2) separating plies into layers, obtaining single layers forming a closed contour, and assigning a unique number to that layer;
   d) performing the plies drop-off distribution by means of a tool that allows carrying out said distribution automatically according to a predetermined staggering rule and the graphical visualization of said distribution;

e) obtaining an output table containing the data required for representing the preliminary ply model in a CAD program and/or representing a sectional view of any of those areas were there is a change in the stacking sequence.

2. A computer-aided method of obtaining a preliminary ply model of a composite component according to claim 1 wherein said predetermined staggering rule is selected among a pyramidal rule, a maximum symmetry rule or a plies at +45/−45 staggered first rule.

3. A computer-aided method of obtaining a preliminary ply model of a composite component according to claim 1 wherein the composite component is a horizontal tail plane skin of an aircraft.

* * * * *